(12) United States Patent
Whitehead

(10) Patent No.: US 8,294,658 B2
(45) Date of Patent: Oct. 23, 2012

(54) PARALLAX-REDUCING, LUMINANCE-PRESERVING DIFFUSER

(75) Inventor: Lorne A. Whitehead, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1317 days.

(21) Appl. No.: 11/572,811

(22) PCT Filed: May 27, 2005

(86) PCT No.: PCT/CA2005/000809
§ 371 (c)(1),
(2), (4) Date: Jan. 26, 2007

(87) PCT Pub. No.: WO2006/010245
PCT Pub. Date: Feb. 2, 2006

(65) Prior Publication Data
US 2007/0222801 A1    Sep. 27, 2007

Related U.S. Application Data

(60) Provisional application No. 60/591,088, filed on Jul. 27, 2004.

(51) Int. Cl.
*G09G 3/36* (2006.01)
(52) U.S. Cl. ........................................ 345/102; 359/599
(58) Field of Classification Search .................. 345/102; 362/296.1, 299, 302, 304, 311.01–311.03, 362/311.07, 298; 385/132; 349/61, 62, 74, 349/65, 95; 359/599
See application file for complete search history.

(56) References Cited

U.S. PATENT DOCUMENTS

| | | | |
|---|---|---|---|
| 4,898,450 A | | 2/1990 | Jannson et al. |
| 5,128,783 A | * | 7/1992 | Abileah et al. ................. 349/162 |
| 5,560,700 A | | 10/1996 | Levens |
| 5,584,557 A | | 12/1996 | Alexay |
| 5,598,281 A | * | 1/1997 | Zimmerman et al. ............ 349/5 |
| 5,810,469 A | * | 9/1998 | Weinreich ..................... 362/298 |
| 5,861,990 A | | 1/1999 | Tedesco |
| 6,005,722 A | | 12/1999 | Butterworth et al. |
| 6,111,228 A | | 8/2000 | Berkcan et al. |
| 6,428,198 B1 | | 8/2002 | Saccomanno et al. |
| 6,671,013 B1 | * | 12/2003 | Ohkawa ......................... 349/62 |

(Continued)

FOREIGN PATENT DOCUMENTS

CN    2211607 A1    11/1995

(Continued)

OTHER PUBLICATIONS

Kan, Peter et al., "Structure for Efficiently Coupling Large Light Sources into Prism Light Guides", Journal of the Illuminating Engineering Society, Summer 2000, pp. 78-82.

(Continued)

*Primary Examiner* — Kevin M Nguyen

(57) ABSTRACT

A diffuser incorporates diffuser elements (10) that each include a waveguide (12) coupled between a concentrator (14) and an inverse concentrator (16). The diffuser (44) may be disposed between a backlight (102) and a modulator (114) in a display (100). Luminance ratios of light rays emitted by a low resolution image-forming backlight (102) toward a high resolution light modulator (114) may be preserved such that, for viewing directions within the display's preferred angular viewing range, an observer perceives no significant change in the luminance of displayed images, irrespective of changes in the observer's viewing direction.

22 Claims, 3 Drawing Sheets

U.S. PATENT DOCUMENTS

| | | | |
|---|---|---|---|
| 7,494,228 B2 * | 2/2009 | Harbers et al. | 353/94 |
| 2001/0012078 A1 * | 8/2001 | Hira et al. | 349/95 |
| 2003/0090455 A1 | 5/2003 | Daly | |
| 2004/0120153 A1 * | 6/2004 | Pate | 362/296 |
| 2006/0132423 A1 * | 6/2006 | Travis | 345/102 |

FOREIGN PATENT DOCUMENTS

| | | | |
|---|---|---|---|
| CN | 2461025 | B2 | 11/2001 |
| CN | 2549486 | B2 | 5/2003 |
| WO | 9423330 | A1 | 10/1994 |
| WO | 9817943 | A1 | 4/1998 |
| WO | 02/069030 | A2 | 9/2002 |
| WO | 03/077013 | A2 | 9/2003 |
| WO | 2004059990 | A2 | 12/2003 |

OTHER PUBLICATIONS

International Search Report for PCT/CA2005/000809, International Searching Authority, Aug. 23, 2005, pp. 1-3.

Seetzen, H. et al., "A High Dynamic Range Display Using Low and High Resolution Modulators", SID 03 DIGST, 2003, pp. 1450-1453.

Yu, et al., "Design of Compound Parabolic Concentrator", Journal of Shanghai University, vol. 32, No. 3, Mar. 1998, pp. 82-86.

* cited by examiner

PARALLAX-REDUCING, LUMINANCE-PRESERVING DIFFUSER

CROSS REFERENCE TO RELATED APPLICATION

This application claims to benefit U.S. application No. 60/591,088 filed 27 Jul. 2004 and entitled "PARALLAX-REDUCING, LUMINANCE-PRESERVING DIFFUSER".

TECHNICAL FIELD

This invention pertains to optics and more particularly to the optics of displays, such as computer displays, television displays and the like. The displays may be LCD displays. The invention can be applied to high dynamic range displays as well as displays of other types.

BACKGROUND

In a typical high dynamic range display, a backlight produces a comparatively low resolution image on an inward side of a light modulator. The low resolution image is modulated by the light modulator to provide a comparatively high resolution image, which appears on the outward side of the light modulator for perception by an observer. The modulator may comprise an LCD. Electronic signals for controlling the backlight and the light modulator may be generated by suitable control circuits of known types. For example, an LCD light modulator may be controlled using control circuits of the same type used to control the LCD modulator in a conventional LCD computer monitor. Example high dynamic range displays are disclosed in international patent publication WO 02/069030 published 6 Sep. 2002 and in international patent publication WO 03/077013 published 18 Sep. 2003, both of which are hereby incorporated by reference herein.

Multiple light sources within the backlight may illuminate each pixel of the light modulator. Maintenance of a relatively small separation distance between the backlight and the modulator allows adjacent pixels of the low resolution image to merge smoothly into one another. Well known image compensation techniques may be applied to remove any undesirable image-blurring artifacts.

One difficulty with such image compensation techniques is that the light intensity (luminance) distributed from a pixel of the low resolution image to a corresponding pixel of the high resolution image is ideally invariant. Otherwise, the intensity of the high resolution image's pixels may vary as a function of the direction from which the image is viewed by an observer, which is undesirable. One common method of achieving such luminance invariance is to incorporate in the display a diffuser having a Lambertian output distribution (i.e. the angular distribution of light rays emanating from the outward side of the diffuser is symmetrical about the diffuser's normal direction and is independent of the direction of the corresponding incident light rays). Such diffusers eliminate parallax (apparent changes in the direction of an object, due to changes in the observer's position which correspond to different lines of sight to the object). Accordingly, the observer does not see unwanted images of things behind the display layer.

Lambertian diffusers undesirably reduce the display's overall luminance by a factor of about ten. This is partly due to backscatter of light rays within the diffuser, and partly due to the diffuser's inherent function of spreading luminous flux over a relatively large solid angle (effectively π steradians, compared to a preferred solid angle of no more than about 0.5 steradians).

The inventors have recognized a need for display apparatus that preserves image luminance in display backlights by confining incident light rays within a preferred angular viewing range, in a manner which reduces viewing parallax by restricting the dependence of the angular distribution of light rays transmitted through the display on the direction from which an observer views the display.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
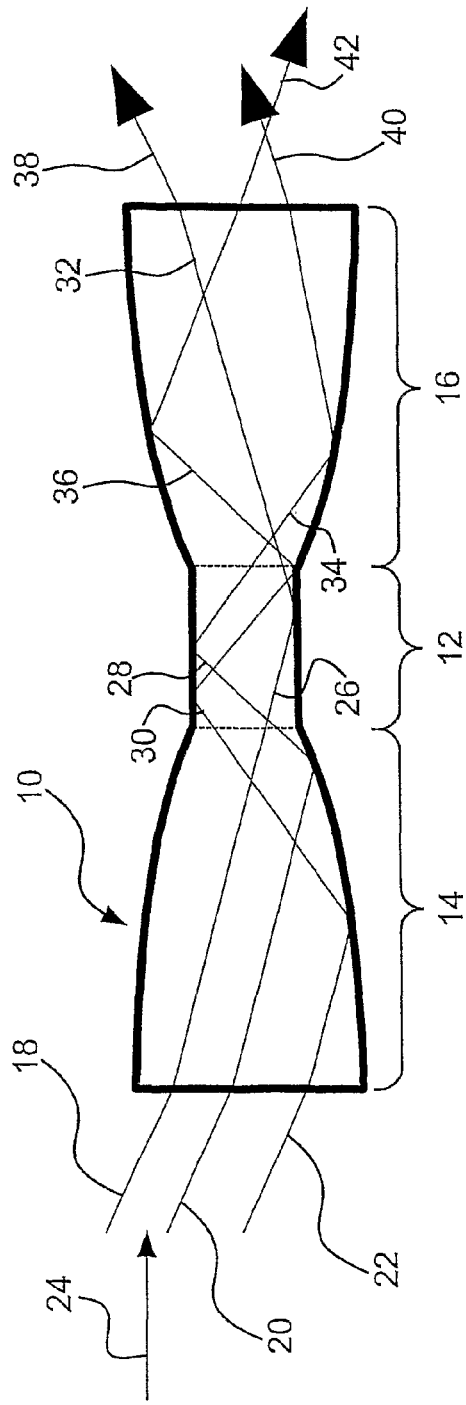
FIG. 1 is a cross-sectional side elevation view, on a greatly enlarged scale, of a diffuser element.

FIG. 1 shows a single diffuser element 10. A diffuser suitable, for example, for use in diffusing light incident from a backlight on a modulator in a display can include a large number of diffuser elements distributed over the diffuser. The display may comprise a high dynamic range display or another type of display such as a conventional LCD display, for example.

Diffuser element 10 includes a cylindrical waveguide 12 optically coupled between a compound parabolic concentrator 14 and an inverse compound parabolic concentrator 16. Waveguide 12 may be formed of any suitable material having an index of refraction sufficiently dissimilar to that of the surrounding material (e.g. air) that light rays are totally internally reflected within waveguide 12. For example, waveguide 12 may be formed of a suitable transparent or dielectric material such as a suitable optically transparent glass or plastic material.

Compound parabolic concentrator 14 concentrates incident light rays 18, 20, 22 and directs light rays from compound parabolic concentrator 14 into waveguide 12. Before incident light rays 18, 20, 22 enter compound parabolic concentrator 14, a collimator (not shown in FIG. 1) collimates rays 18, 20, 22 such that, for an air medium, rays 18, 20, 22 lie within a preferred angular viewing range, namely within about 25° of the display's normal direction indicated by arrow 24. Collimation maximizes the number of light rays which enter compound parabolic concentrator 14, thus maximizing the number of light rays which are coupled into waveguide 12.

Compound parabolic concentrator 14 and inverse compound parabolic concentrator 16 may be formed of any suitable material or materials having an index of refraction sufficiently dissimilar to that of the surrounding material (e.g. air) that light rays are totally internally reflected at their boundaries. Compound parabolic concentrator 14 and inverse compound parabolic concentrator 16 may each be made of the same material as waveguide 12. For example, compound parabolic concentrator 14 and inverse compound parabolic concentrator 16 may be made of suitable transparent or dielectric materials such as suitable optically transparent glass or plastic materials. In some embodiments, compound parabolic concentrator 14, inverse compound parabolic concentrator 16 and waveguide 12 are all made of the same material. This avoids reflections at interfaces between compound parabolic concentrator 14, inverse compound parabolic concentrator 16 and waveguide 12.

Waveguide 12 totally internally reflects and spatially homogenizes concentrated light rays 26, 28, 30 before they pass into inverse compound parabolic concentrator 16. In this context, "spatial homogenization" means that information characterizing the direction of light rays entering waveguide 12 is substantially removed. Spatially homogenized light rays 32, 34, 36 are directed out of diffuser element 10 by inverse compound parabolic concentrator 16 (which may be a compound parabolic collimator). Light rays 32, 34, 36 emerge from diffuser element 10 as corresponding rays 38, 40, 42. Inverse compound parabolic concentrator 16 may restore the light emitted from diffuser element 10 to a level of collimation similar to or the same as that of the light incident on diffuser element 10.

Compound parabolic concentrators are well known, well-defined optical devices. For example, see *Structure for Efficiently Coupling Large Light Sources in Prism Light Guides*, P. Kon et al., Journal of the Illuminating Engineering Society, p. 78-82, 2000. The diameter of waveguide 12 is selected to match the diameters of concentrators 14, 16 where they respectively intersect waveguide 12. The length of waveguide 12 is not critical. Waveguide 12 is preferably sufficiently long that light rays are totally internally reflected a significant number of times (e.g. 2 or more and preferably 3 or more times or even 10 or more times) as they pass through waveguide 12 in order to attain the aforementioned spatial homogenization. This generally means that waveguide 12 has a length that is at least twice its diameter (if waveguide 12 is round in cross section) or its largest transverse dimension (if waveguide 12 is not round in cross section).

Figure 2:
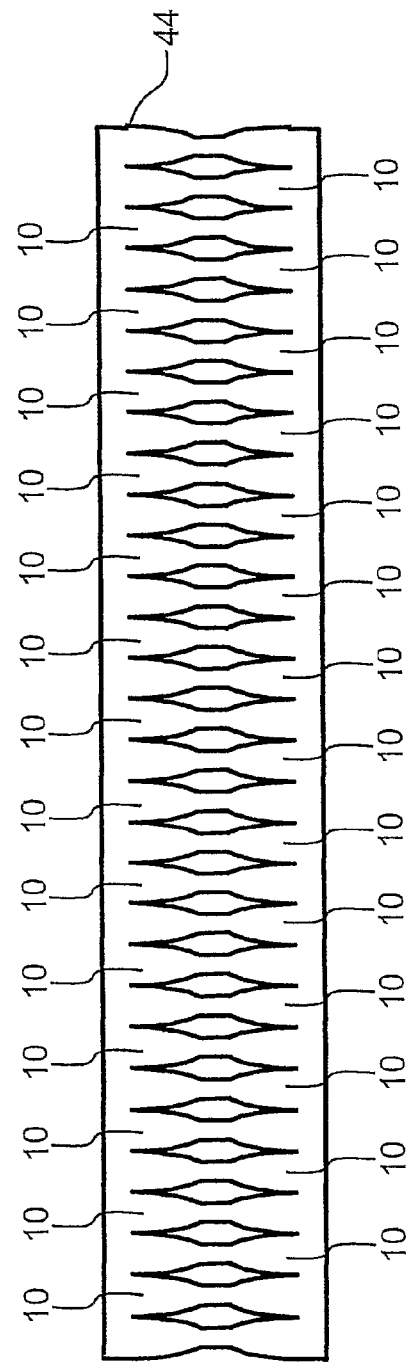
FIG. 2 is a cross-sectional top plan view, on a greatly enlarged scale, of a fragmented portion of a diffuser sheet incorporating a plurality of the FIG. 1 diffuser elements.
Figure 3:
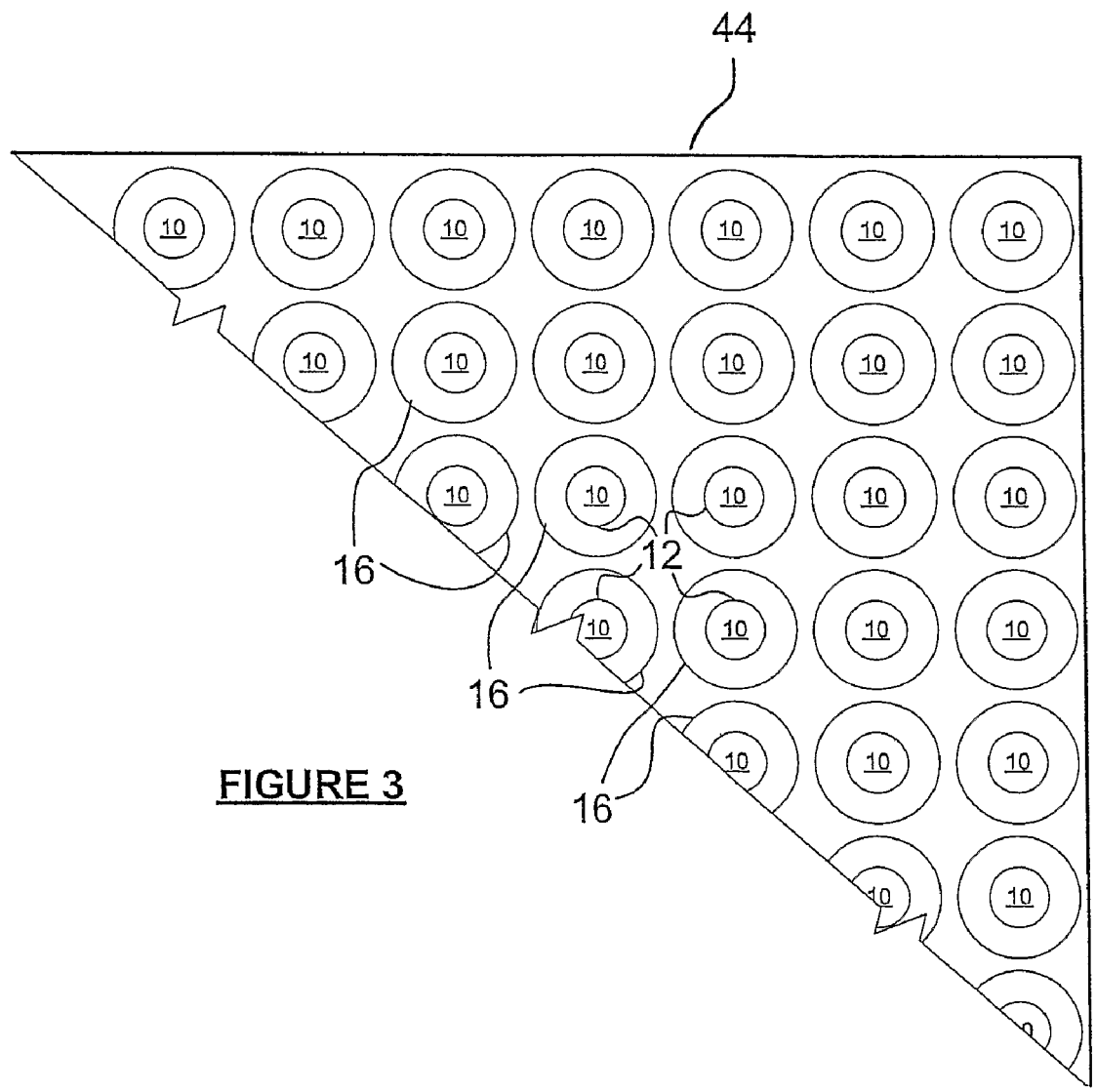
FIG. 3 is a front elevation view, on a greatly enlarged scale (and larger than that of FIG. 2), of a fragmented portion of the FIG. 2 diffuser sheet.

FIGS. 2 and 3 depict a portion of a diffuser sheet 44 incorporating a large plurality of diffuser elements 10. Sheet 44 preserves image luminance by maximizing the likelihood that a light ray emanating from a pixel of the low resolution image will reach and contribute to the luminance of a corresponding pixel of the high resolution image. By spatially homogenizing light rays which pass through each diffuser element 10, sheet 44 also substantially removes those rays' incident angular distribution characteristic, within the desired 25° collimation angle. Consequently, the luminance ratios of light rays passing from the low resolution image to and forming the high resolution image, are perceived by persons observing the display to be substantially independent of the observer's viewing direction, within the desired viewing range. This facilitates accurate application of any suitable image compensation techniques to remove undesirable artifacts such as blurring artifacts.

Figure 4:
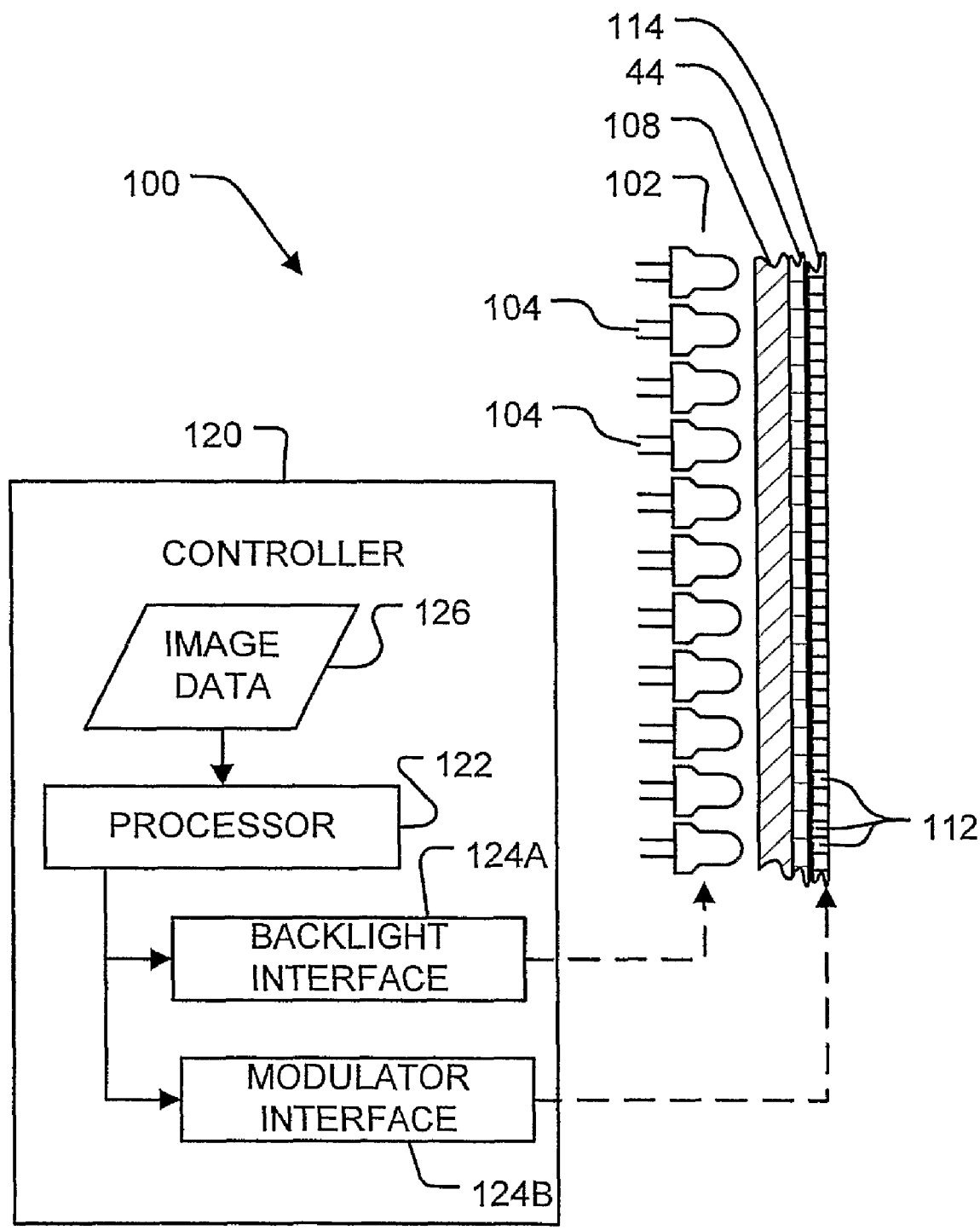
FIG. 4 is a schematic cross-section through a portion of a display incorporating a diffuser sheet like that of FIG. 2.

FIG. 4 shows a display 100 that incorporates a diffuser sheet 44. Display 100 includes a backlight 102. In the illustrated embodiment, backlight 102 comprises an array of light emitting diodes (LEDs) 104. Light emitted by LEDs 104 passes through a collimator 108. Collimator 108 is preferably of a type that "recycles" light that is not traveling within the angular range that is passed by the collimator. Collimated light passes through waveguides 12 (not shown in FIG. 4) of sheet 44 and impinges on pixels 112 of a light modulator 114. Light modulator 114 may be an LCD panel or other transmission-type light modulator, for example.

In the illustrated embodiment a controller 120 comprising a graphics data processor 122 and suitable interface electronics 124A for controlling backlight 102 and 124B for controlling light modulator 114 receives image data 126 specifying images to be displayed on display 100 and drives the light emitters (e.g. LEDs 104) of backlight 102 and the pixels of light modulator 114 to produce the desired image for viewing by a person or persons. Controller 120 may comprise a suitably programmed computer having appropriate software/hardware interfaces for controlling backlight 102 and light modulator 114 to display an image specified by image data 126.

Typically diffuser elements 10 are much smaller in diameter than the pixels of a high resolution light modulator that they illuminate. Each pixel of the high resolution modulator may be illuminated by light passing through a plurality of diffuser elements 10. For example, diffuser elements 10 may have diameters of 10's of microns (i.e. in the range of about 10 microns to about 100 or 200 microns) while each pixel of a high resolution modulator may have dimensions on the order of 100's of microns (e.g. typically in excess of about 100 microns). A single pixel of a high resolution modulator may be illuminated by light that has passed through 10 or more diffuser elements 10. In some embodiments, each diffuser element 10 is sized to correspond to the size of one pixel of the display's high resolution image.

Where a component (e.g. a member, part, assembly, device, processor, controller, collimator, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the scope thereof. For example:

- Although described above in relation to high dynamic range displays, the invention is of general application and can be used in conjunction with any direct backlight display sub-system, such as a liquid crystal display (LCD). Such an LCD may be backlit, for example, by an array of individual light sources such as an array of red-green-blue Luxeon DCC™ light emitting diode light sources available from Lumileds Lighting, U.S. LLC of San Jose, Calif.
- Waveguide 12 and concentrators 14, 16 need not be circular in cross-section, but may have other cross-sectional shapes. For example: waveguide 12 may be rectangular or hexagonal in cross-section; concentrators 14, 16 may be conically shaped. Such alternative shapes are less optically efficient than the shapes described above but may be acceptable in some applications where it is desirable to make a diffuser that is easier and less expensive to fabricate.
- Diffuser elements 10 need not be laid out in square grid fashion as shown in FIG. 3, but may have any other desired layout (e.g. random distribution, hexagonal, rectangular grid, etc.) compatible with the layout of the pixels or pixel groups of the display sheet.
- It is not mandatory that parabolic concentrator 14 and inverse compound parabolic concentrator 16 are the same size as one another although both will typically by of the same, or a similar, size to match waveguide 12.

Instead of providing structures in which light is totally internally reflected, parabolic concentrator 14, inverse compound parabolic concentrator 16 and/or waveguide 12 may be made by providing reflective coatings or by providing a reflective material such as a reflective metal surrounding parabolic concentrator 14, inverse compound parabolic concentrator 16 and/or waveguide 12. In such embodiments the parabolic concentrator 14, inverse compound parabolic concentrator 16 and/or waveguide 12 may be provided in the form of a hollow structure with reflective walls.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. A diffuser sheet having parallel opposing spaced apart light-incident and light-emitting sides, the diffuser sheet comprising a plurality of diffuser elements, each diffuser element comprising:
   a concentrator positioned in the diffuser sheet toward the light-incident side to receive light incident on the diffuser sheet;
   an inverse concentrator positioned in the diffuser sheet toward the light-emitting side wherein the concentrator and inverse concentrator are spaced apart from one another; and
   an internally-reflecting waveguide optically coupled between the concentrator and the inverse concentrator the waveguide configured to carry light from the concentrator to the inverse concentrator.

2. A diffuser sheet according to claim 1, wherein the concentrator is a compound parabolic concentrator.

3. A diffuser sheet according to claim 1, wherein the inverse concentrator comprises an inverse compound parabolic concentrator.

4. A diffuser sheet according to claim 2, wherein the compound parabolic concentrator concentrates incident light rays to maximize the number of light rays passing from the compound parabolic concentrator into the waveguide.

5. A diffuser sheet according to claim 4, comprising a collimator for collimating the incident light rays, before the incident light rays enter the compound parabolic concentrator.

6. A diffuser sheet according to claim 5, wherein the collimator causes the incident light rays to be directed within about 25° of a direction normal to the diffuser sheet.

7. A diffuser sheet according to claim 5, wherein the waveguide decollimates the concentrated light rays and optically couples the decollimated light rays into the inverse compound parabolic concentrator.

8. A diffuser sheet according to claim 7, wherein the inverse compound parabolic concentrator collimates the spatially homogenized light rays to substantially the same extent that the collimator collimated the incident light rays.

9. A diffuser sheet according to claim 1 wherein the waveguide comprises an optically-transparent dielectric material surrounded by air.

10. A display comprising a diffuser sheet according to claim 1 located between a backlight and a light modulator.

11. A display according to claim 10 comprising a collimator between the backlight and the diffuser sheet.

12. A display according to claim 11, wherein the collimator causes the majority of light incident on the diffuser sheet to be directed within a viewing angle of 25° to a line perpendicular to the diffuser sheet.

13. A display according to claim 10 wherein the backlight comprises a plurality of individually-controllable light sources.

14. A display according to claim 13, wherein the individually-controllable light sources comprise light-emitting diodes.

15. A display according to claim 10 wherein:
   the modulator comprises a plurality of pixels each having a controllable light transmission; and
   the diffuser sheet comprises a plurality of the diffuser elements within a projected area on the diffuser sheet of each of the plurality of pixels.

16. A display according to claim 13 comprising a controller configured to control intensities of the individually-controllable light sources to provide a low resolution version of an image defined by image data on the modulator.

17. A display according to claim 16, wherein the controller is configured to control the pixels of a modulator to display the image for viewing at a resolution higher than that of the low resolution version of the image.

18. A diffuser sheet according to claim 1, wherein the length of the waveguide is at least two times as long as the diameter of the waveguide.

19. A diffuser sheet according to claim 1, wherein the waveguide is sufficiently long that light rays are totally internally reflected within the waveguide at least 3 times in being carried from the concentrator to the inverse concentrator.

20. An optical element, comprising:
   an array of diffusion elements disposed on a sheet having a light-incident side and a light-emitting side opposite the light-incident side;
   each diffusion element comprising,
      a concentrator configured to receive light incident at the light-incident side,
      an inverse concentrator configured to emit light from the light-emitting side wherein the concentrator and inverse concentrator are spaced apart from one another; and
      an internally-reflecting waveguide optically coupled between the concentrator and the inverse concentrator the waveguide configured to carry light from the concentrator to the inverse concentrator.

21. An optical element according to claim 20, the optical element further comprising a collimator for collimating incident light rays to be directed within about 25° of a direction normal to the sheet, wherein:
   the concentrator is a compound concentrator;
   the compound concentrator concentrates incident light rays from the collimator into the waveguide; and
   the waveguide decollimates the concentrated light rays and optically couples the decollimated light rays into the inverse concentrator.

22. An optical element according to claim 20, wherein the waveguide comprises an optically-transparent dielectric material surrounded by air.

* * * * *